United States Patent [19]

Roth et al.

[11] 4,455,182

[45] Jun. 19, 1984

[54] TAPERED ARTICLE LABELLING MACHINE MODIFICATION ASSEMBLY AND LABEL APPLICATION METHOD

[75] Inventors: William F. Roth; Nevin Snyder, both of Hanover, Pa.

[73] Assignee: New Way Packaging Machinery, Inc., Hanover, Pa.

[21] Appl. No.: 532,914

[22] Filed: Sep. 16, 1983

[51] Int. Cl.[3] .......................... B29C 17/04; B61C 9/04

[52] U.S. Cl. .......................... 156/215; 156/291; 156/449; 156/451; 156/453; 156/564; 156/573

[58] Field of Search .......................... 156/446-449, 156/451, 453, 455, 564-565, 573, 567, 568, 291, 212, 215

[56] References Cited

U.S. PATENT DOCUMENTS

| | | | |
|---|---|---|---|
| 1,355,563 | 10/1920 | Nichols | 156/451 |
| 1,413,590 | 4/1922 | Kallenbach | 100/144 |
| 1,567,149 | 12/1925 | Kallenbach | 100/144 |
| 2,495,174 | 1/1950 | McClatchie | 156/451 |
| 3,017,311 | 1/1962 | Mattingly | 156/453 X |
| 3,454,448 | 7/1969 | Flynn | 156/451 X |
| 4,332,635 | 6/1982 | Holbrook et al. | 156/567 |

*Primary Examiner*—David A. Simmons

*Attorney, Agent, or Firm*—Samuel M. Learned, Jr.

[57] ABSTRACT

A modification assembly to be supplied either as original equipment or as a replacement improvement to a tapered article labelling machine wherein there is provided the combined and cooperative improved mechanical retention and conveyable guidance of a succession of tapered articles through the labelling machine, and in addition an improved tapered article adhesive applicator assembly and adhesive application method whereby successive individual tapered article lateral wrap alignment of each label respectively thereupon of the tapered article succession is greatly improved in addition to being able to more closely conform the label to a tapered article from the point of label application contact thereto through completion of wrap with a corresponding elimination of label bulge and after-application label popping problems.

5 Claims, 11 Drawing Figures

Fig. 2
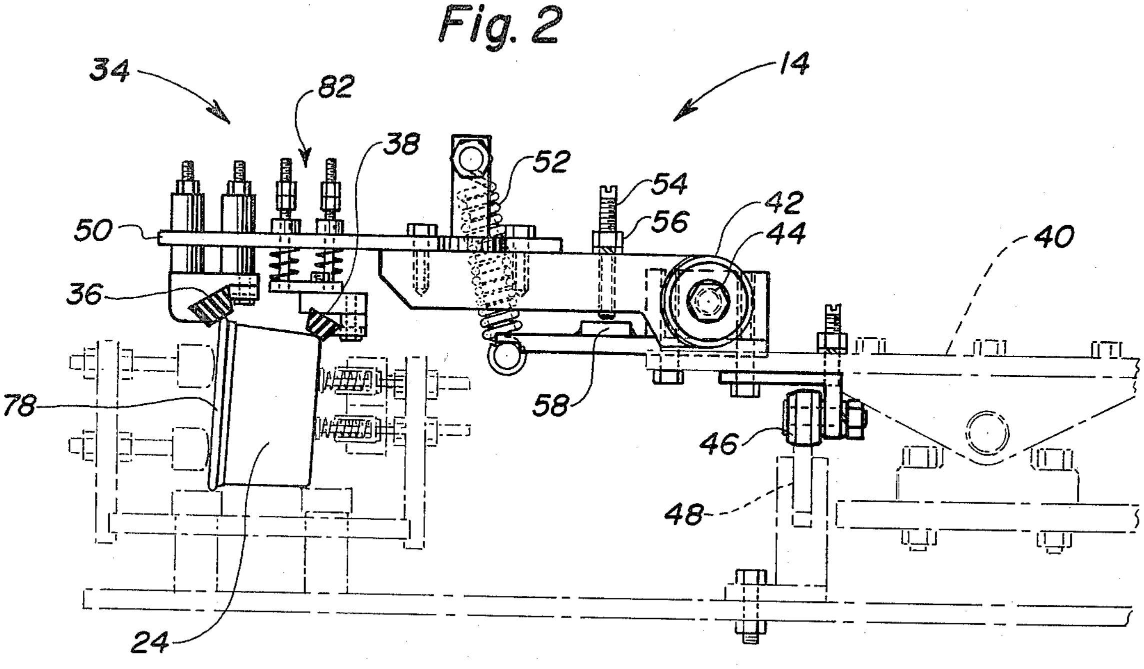
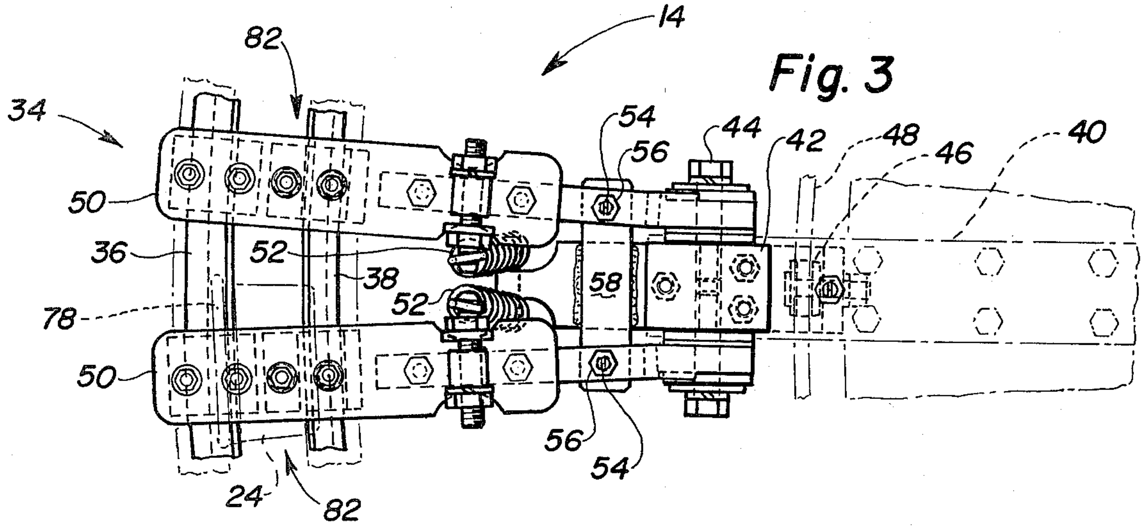
Fig. 4
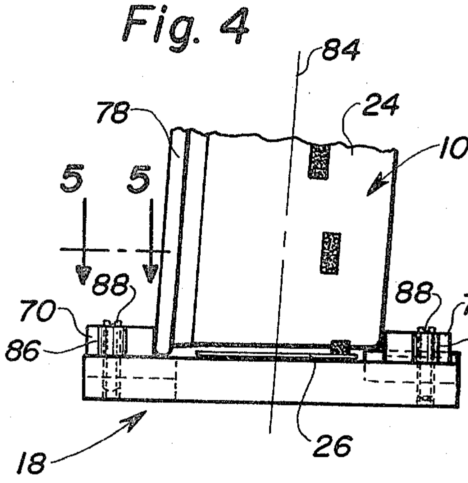
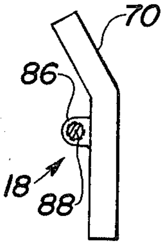
Fig. 5
Fig. 6
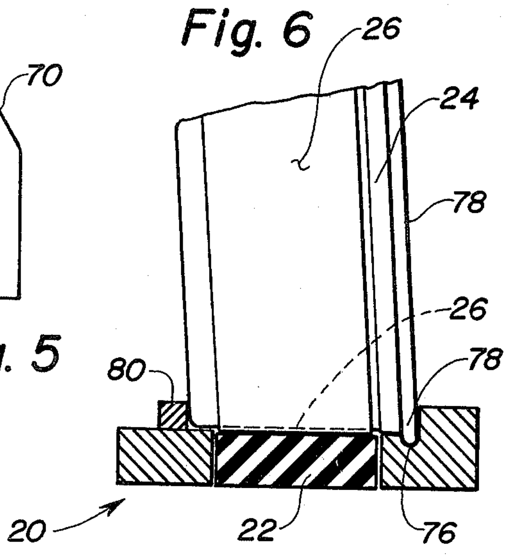

Fig. 7
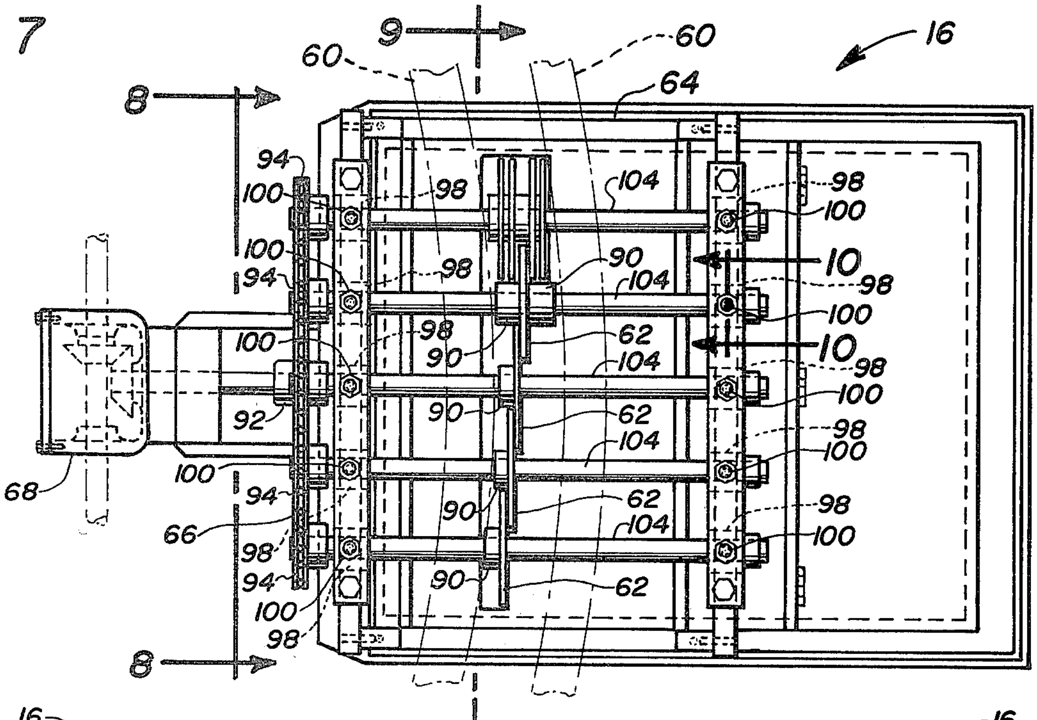
Fig. 8
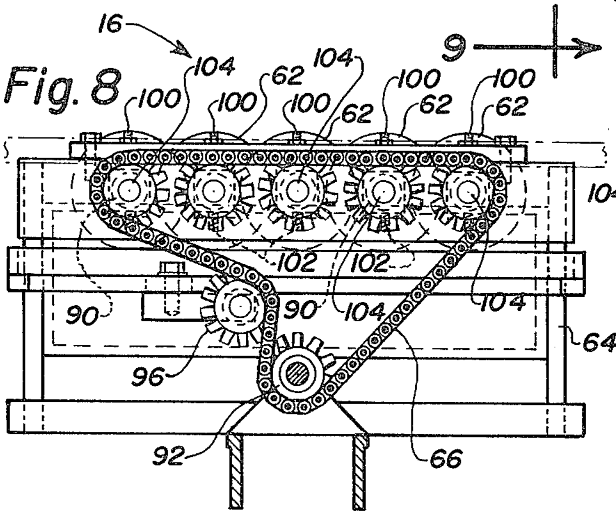
Fig. 9
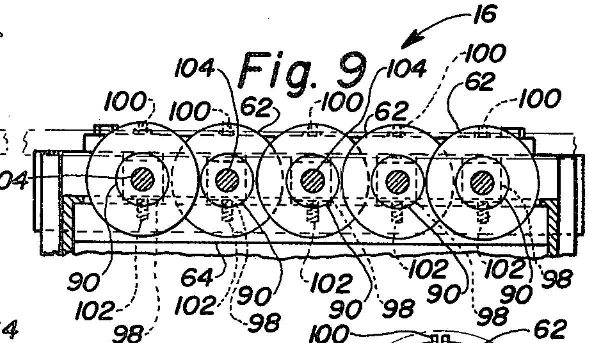
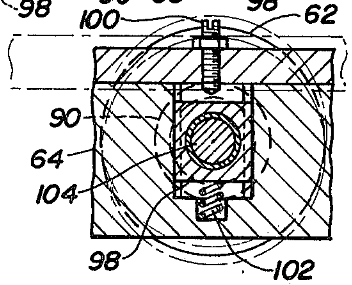
Fig. 10
Fig. 11
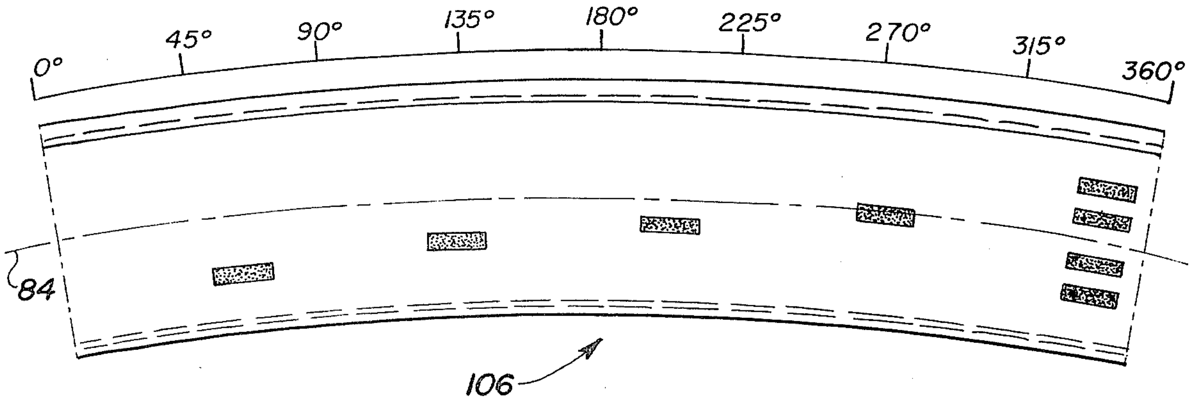

TAPERED ARTICLE LABELLING MACHINE MODIFICATION ASSEMBLY AND LABEL APPLICATION METHOD

BACKGROUND OF THE INVENTION

It is to be understood that the present invention discloses an improvement modification assembly to a tapered article labelling machine and method of applying label adhesive to the tapered article exterior peripheral sidewall surface so as to improve and enhance label wrap register and conformable adhesion thereto.

Additionally, specific reference is herein made to instant co-applicants presently copending U.S. Apllication For Patent, Ser. No. 386,253 filed June 8, 1982, titled Tapered Article Labelling Machine And Method, wherein an exemplary machine for tapered article labelling, with which the instant improvement modification disclosure and method thereof is adapted to be employed, is illustrated and described in detail.

In accomplishing high-speed tapered article labelling by use of the type machine which employs a radial array of spring-loaded cam-cycled rotating arm members to first conveyably engage and then propel a succession of tapered articles sequentially about a circular shaped guide track along which various sub-assembly adhesive and label application stations are positioned, which is generally that type of tapered article labelling machine taught by the above-referenced copending Application For Patent and instantly shown as being that type of machine upon which the improvement modification assembly as herein disclosed is suitable for installation, two operational considerations are of primary importance. First, the initial and continued conformable alignment of the arcuate longitudinal axis of the label with that of the tapered article sidewall surface to which the label is to be applied, from beginning to end of label application wrap, is critical and must be maintained throughout if the label is to be applied in lateral register with respect to the exterior sidewall surface of the tapered article. Second, incremental longitudinal application of adhesive and label to the tapered article exterior sidewall surface not only enhances lateral label registration control during wrap application but also enables enhanced close conformity of the label to the tapered article exterior sidewall surface thus eliminating label bulge and after-application label popping problems otherwise consequent therefrom.

In addition to co-applicant's copending Application For Patent cited above, the prior art as taught in U.S. Pat. No. 1,413,590 to Kallenbach dated Apr. 25, 1922, and U.S. Pat. No. 1,567,149 also to Kallenbach dated Jan. 11, 1924, respectively show a machine having a rotating platform somewhat similar to that of the type of tapered article labelling machine of instant consideration, but, however, being provided with a plurality of radially extending jaws respectively in which an individual container with an adhesively applied label is separately clamped to provide compression therebetween during adhesive set and thereby eliminate after-application popping problems.

It should be understood that some of the features of the instant invention have, in some respects as to both the machine modification assembly and the improved label application method provided thereby certain structural and functional similarities to teachings separately set forth in the prior art disclosures heretofore cited and briefly discussed. However, as will be hereinafter pointed out, the instant invention in both machine modification assembly and label application method is distinguishable from said earlier inventions in one or more ways in that the present invention provides utility features and new and useful advantages, applications, and improvements in the art of tapered article labelling machinery and methods not heretofore known.

SUMMARY OF THE INVENTION

It is the principal object of the present invention to provide a tapered article labelling machine modification assembly which improves both the lateral label wrap register circumferentially to a tapered article exterior peripheral sidewall surface and the close circumferential conformity of an adhesive-applied full-wrap label affixed thereto.

It is another object of the present invention to provide a cooperative and sequentially progressive adhesive and label application method for accomplishing tapered article labelling as aforesaid which further enables a modified tapered article labelling machine to be operated at the rated output capacity thereof and deliver labeled articles without bulged label problems.

It is also an object of the present invention to provide an improved tapered article mechanical retention and conveyancing guidance system which thereby enables increased tapered article loading density of the tapered article labelling machine in turn enabling operation of said machine at a slower run speed for better operational control in accomplishing improved label application as to lateral register and wrap conformity circumferentially about the tapered article while at the same time delivering labelled product at the machine rated output capacity.

Still another object of the present invention is to enable the production delivery of labeled tapered articles which may be cartoned or packed for either storage or shipment without after-application label popping problems.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 2 is an enlarged side elevation view of the improved conveyor arm assembly shown in FIG. 1 as seen along the line 2—2 thereof.

FIG. 3 is a top plan view of the improved conveyor arm assembly as shown in FIG. 2.

FIG. 4 is an enlarged partial end elevation of that portion of the improved guidance track assembly with tapered article register guides shown in FIG. 1 as seen along the line 4—4 thereof.

FIG. 5 is a top plan view of the tapered article register guide shown in FIG. 4 as seen along the line 5—5 thereof.

FIG. 6 is an enlarged end elevation view of the improved tapered article guidance track assembly shown in FIG. 1 as seen along the line 6—6 thereof.

FIG. 7 is an enlarged top plan view of the improved adhesive applicator as shown in FIG. 1.

FIG. 8 is an end elevation view of the improved adhesive applicator chain-and-sprocket drive assembly shown in FIG. 7 as seen along the line 8—8 thereof.

FIG. 9 is an end elevation view of the improved adhesive applicator wheel assembly shown in FIG. 7 as seen along the line 9—9 thereof.

FIG. 10 is an enlarged end elevation of one of the improved adhesive applicator wheel assemblies as shown in FIG. 9, and in particular illustrating in greater detail the spring-loaded drive shaft bearing sub-assembly therefor.

FIG. 11 is a tapered can blank rendition shown in the flat condition prior to forming, and illustrating thereon the improved adhesive applicator label adhesive pattern by the method hereof as to both lateral positioning and arcuate displacement thereof on the can exterior surface.

DETAILED DESCRIPTION OF THE INVENTION

Figure 1:
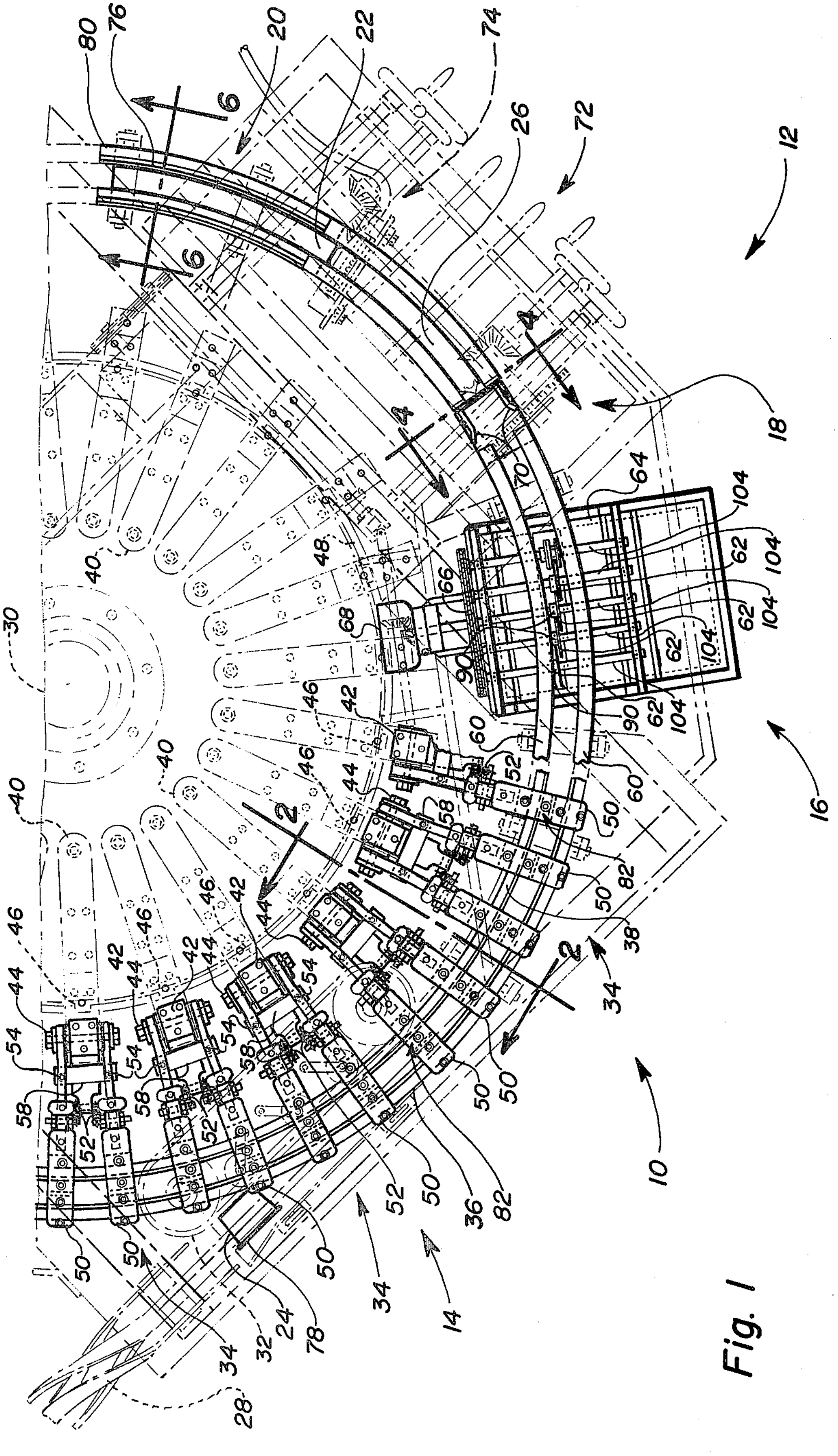
FIG. 1 is a top plan view of a portion of applicant's prior art tapered article labelling machine support structure as shown in phantom, with the improved conveyor arms, adhesive applicator and the tapered article register and guidance track assemblies of instant invention shown in solid line rendition.

Referring to FIG. 1, the present invention is shown which comprises a tapered article labelling machine modification assembly 10, which for purposes of illustration clarity is shown in solid line rendition, installed upon and in combination with a typical tapered article labelling machine 12, which in turn for purposes of illustration clarity is shown in phantom line rendition, wherein said machine modification assembly 10 has as major sub-assembly components thereof a regularly repeating radial array of improved conveyor arm assemblies 14 which operate to provide a more positive close contact lateral control over formed tapered articles during operational conveyable processing transport thereof through the various machine 12 processing stations in accomplishing label application, an improved adhesive applicator assembly 16 which enables the incremental metered imprinting of label adhesive in a longitudinal extending progressively lateral displaced pattern across the exterior sidewall surface of a formed tapered article which thereby provides for the improved method of label application affixment hereof likewise being in a longitudinally extending progressively lateral displaced adhesion to the tapered article exterior sidewall surface resulting in elimination of label bulge and after-application popping problems and greatly improving the consistent lateral wrap label register to the tapered article exterior sidewall surface, and in addition to the foregoing there is also provided a set of tapered article register guides 18 which function to angularly align the tapered article head and tail surfaces so that the longitudinally extending arcuate traces thereof are respectively made to be in mechanically parallel equally outward spaced register from the longitudinally extending centrally intermediate arcuate label axis immediately prior to label pick-up and progressive wrap adherence affixment thereof to the tapered article exterior sidewall surface and lastly a guidance track assembly 20 which provides and maintains improved tapered article exterior sidewall surface lateral register to the seaming pad 22 during close conformance passage of the applied label to the tapered article as aforedescribed prior to discharge delivery thereof from said machine 12.

Referring again to FIG. 1 to describe in greater detail the component parts of this improvement modification invention as well as also explain the cooperative operation and method of use thereof, wherein is shown an exemplary tapered article 24 which for purposes of continued discussion and not to be considered as limiting will be identified as that type of metal alloy can commonly employed for either Salmon or Tuna packing, the same of which is sequentially delivered to said machine 12 by means of infeed delivery twist chute 28 for high speed close tolerance lateral wrap register application of labels 26 thereto without bulging or after-application popping problems, wherein said labels 26 may have a paper base, but may also be imprinted upon or constructed of any other suitable material.

As shown in FIG. 1, sequential successive positioning of the tapered cans 24 by the infeed delivery twist chute 28 is respectively with the bottom surface thereof inward facing towards the turntable drive shaft 30 of said machine 12 for engagement initially by the tapered article pick-up drive belt 32 of said machine 12, followed by conveyable engagement and accelerated processing displacement of the tapered articles by the improved conveyor arm assemblies each of which is provided with a spring tensioned bifurcated arm structure 34 adapted to deflectably support an inwardly aligned tapered article head engagement conveyor belt 36 which laterally stabilizes compressively a tapered article 24 during conveyable transport displacement cooperatively with the spring biased outwardly aligned tapered article tail engagement conveyor belt 38 thereof.

The spring tensioned bifurcated arm structures 34 are respectively assembled pivotally to the turntable base connecting arms 40 of said machine 12 cooperatively therewith by a bearing 42 and pintle 44 and each such spring tensioned bifurcated arm structure 34 is cycled by means of a cam follower 46 radially tracking the machine 12 cam 48 whereby an infeed succession of tapered articles for labelling is moved through an elevation profile during labelling operation conveyable transit through the various operational stations of said machine 12. It should also be noted that each arm 50 of the bifurcated arm structure 34 is individually tensioned about said pintle 44 by means of a tension spring 52 the tensioning force effect of which may be adjustably varied by means of set screw 54 and set screw lock nut 56 downwardly against spring tension set screw engagement plate 58 whereby primary lateral guidance control force upon tapered articles cooperatively through the head engagement conveyor belt 36 and the tail engagement conveyor belt 38 during successive sequential conveyable transport displacement through said machine 12 for labelling is both set and maintained.

Next, the tapered articles 24 are conveyably advanced to the laterally spaced adhesive applicator conveyancing rails 60 and while supported thereon pass through the improved adhesive application assembly 16 which applies a longitudinally progressive laterally offset adhesive pattern to the tapered article exterior peripheral sidewall surface by means of a series of longitudinally displaced laterally offset adhesive application wheels 62 which partially submerge in the adhesive reservoir 64 and are driven in timed rotary displacement with the conveyed tapered articles through chain-and-sprocket drive 66 powered by take-off from the machine 12 primary drive through angled gear transmission 68.

Following adhesive application as previously described the glued-up tapered articles 24 successively feed into and through the tapered article register guides 18 which are simply a laterally spaced set of inward-leading guide flanges 70 that are set so as to insure arcuately parallel centrally intermediate alignment of the arcuate longitudinal axis of tapered article with the corresponding arcuately parallel centrally intermediate arcuate longitudinal axis of the label 26 to be applied thereto thereby substantially insuring initiation of lateral wrap register of the label 26 to the tapered article sidewall surface.

Following adhesive application the tapered articles are rotationally advanced to the label feed station 72 and during transit therethrough progressively strip sequentially the uppermost label therefrom and concurrently therewith progressively adheres the label incrementally both longitudinally and laterally across the exterior sidewall surface of the tapered article which adhereing method enables the maintenance of initial lateral wrap register orientation of the tapered article to the label as accomplished by the tapered article register guides 18 and further enables close conformance wrapping of the tapered article with the label without bulging problems. As a label-applied tapered article exits the label feed station 72 it engages and triggers the label head elevator and tail adhesive applicator 74 which applies a second adhesive for glueing-off the wrapped label end prior to continued passage into the guidance track assembly 20 and seaming pad 22 for close-control conformable pressing of the applied label to the tapered article exterior sidewall surface, wherein the guidance track assembly 20 is provided with an arcuate groove track 76 which is adapted to receive the tapered article head bead 78 and an arcuate tail guide rail 80 adapted to limit lateral movement of the tapered article during seaming pad pressing of the applied label and the same may be accomplished without label slippage and thereby substantially eliminate any after-application label popping problems.

Preferably, the tapered article labelling machine modification assembly 10 as disclosed in FIG. 1 is constructed of various metals and alloys, but other suitable materials or combinations thereof as appropriate may be used.

Referring to FIGS. 2 and 3 concurrently, which are enlarged side elevation and top plan views respectively of one of the spring tensioned bifurcated arm structures 34 of the improved conveyor arm assembly 14, wherein is additionally shown by the greater detail thereof in both illustrations the adjustable compression spring assemblies 82 operable for setting compressive force of the outwardly angled tapered article tail engagement conveyor belt 38 upon said tapered article 24 contact surface so as to be made cooperatively compressive with that of the tapered article head engagement conveyor belt 36 in turn set by means of primary tension spring 52 and set screw 54 as previously described.

The view in FIG. 4 shows angular alignment of a tapered article 24 with a label 26 by means of the tapered article register guides 18 so that the respective arcuately longitudinal axes thereof indicated by line 84 fall in coincidental alignment which in turn insures initiation of a label-to-tapered article exterior sidewall surface lateral wrap register.

The illustration shown in FIG. 5 is an enlarged top plan view of one of the tapered article register guides 18 showing more specifically the inward-leading guide flange 70 thereof in addition to the register guide attachment boss 86 and the attachment screw 88 by which means said register guide is adjustably affixed in place to function as described.

Referring now to FIG. 6, the close tolerance transit of a labeled can 24 through the seaming pad 22 pressing operation is illustrated in enlarged end elevation view, and in particular shows the tracking relationship thereof to the arcuate tail guide rail 80 and the concurrent tapered article head bead 78 cooperative guidance control engagement with the arcuate groove track 76 to thereby insure maintenance of lateral angular stability of the applied label 26 arcuate longitudinal axis with that of the tapered article exterior sidewall surface so there will be no label angular slippage which in turn would result in a loss of lateral wrap register during the rotary transit label-to-can close conforming pressing operation.

Turning now to a concurrent consideration of the improved adhesive application assembly illustrations shown in FIGS. 7 through 10 inclusive, regarding first among them the FIG. 7 illustration wherein it will be noted that the adhesive application wheel mounting collars 90 each serve as doctor rollers respectively for the next successive longitudinally displaced laterally offset adhesive application wheel 62, which is that mechanical provision whereby a controlled metered amount of adhesive is imprinted upon the tapered article exterior sidewall surface which in turn contributes to prevention of label slippage during high-speed close-density label application operations.

In FIG. 8 the adhesive application assembly chain-and-sprocket drive 66 is shown in enlarged side elevation view wherein is seen the main drive sprocket 92, the individual adhesive application wheel power take-off sprockets 94, and the idler sprocket 96 therefor.

In FIG. 9 the doctor wheel relationship for obtaining a controlled metered amount of adhesive on each adhesive application wheel 62, between the wheel mounting collars 90 respectively with each successive application wheel 62, is illustrated in side elevation view as seen along the line 9—9 of FIG. 7.

The FIG. 10 enlarged end elevation view of an adhesive application wheel unit shows therein detail of the floating spring-loaded bearing 98, a feature which provides resilient imprinting pressure to the tapered article exterior sidewall surface during adhesive transfer impression by the application wheels 62 which in turn insures uniform adhesive film transfer thickness. The upper bearing deflection displacement is adjustably limited by bearing set and stop screw 100 and the bearing acts in downward deflection against bearing recoil spring 102. It will be noted that floating spring-loaded bearings 98 are provided at both ends of the adhesive application wheel drive shafts 104.

Lastly, the view shown in FIG. 11 illustrates a tapered article in the pre-formation crescent-shaped blank configuration thereof showing the arcuate longitudinal axis trace 84 and the relative positioning with respect thereto of the longitudinally extending progressively lateral displaced adhesive pattern 106 whereby the close tolerance lateral wrap register label application method of instant invention as previously herein described in detail is accomplished.

Although the invention and method thereof have been herein shown and described in what are conceived to be the most practical and preferred embodiments, it is recognized that departures may be made respectively therefrom within the scope of the invention, which is not to be limited to the details disclosed herein but is to be accorded the full scope of the claims so as to embrace any and all equivalent devices, apparatus, and methods.

We claim:

1. A tapered article labelling machine modification assembly adapted to be installed upon a tapered article labelling machine of a type having an infeed end and a delivery end interconnected by an arcuate tapered article guide track and provided with a radial arm conveyor assembly having a plurality of like radial arm members for progressively engaging and axially rotating therewith a successive stream of tapered articles along said guide track, said modification assembly comprising in combination:

a. a spring tensioned bifurcated arm means for each of said radial arm members of said plurality comprising said radial arm conveyor assembly, b. an improved adhesive application station having a plurality of longitudinally extending progressively laterally displaced adhesive wheel means in turn laterally positioned within said tapered article guide track therealong intermediate said infeed end and said delivery end and adapted to apply to the external circumferential sidewall surface respectively of each tapered article in the succession comprising said stream a longitudinally extending progressively lateral displaced adhesive application pattern corresponding to said application wheel disposition array, c. a laterally spaced set of tapered article register guide means assembled along said guide track in arcuate displaced spaced disposition relative to the delivery end of said adhesive application station and adapted to receivably direct therefrom said tapered articles of said succession respectively in circumferentially rotational passage therethrough and in lateral sidewall label wrap registered angular alignment therewith coincidental to continued rotational passage respectively thereof to a label pick-up station, and d. a guidance track assembly having an arcuate groove track adapted to rotationally receive in respective succession the head bead of a labeled tapered article said groove track being arcuately parallel in laterally spaced disposition to an arcuate tail guide rail adapted to cooperatively guide therewith the lower circumferential contact surface of a tapered article and having a longitudinally extending conformably arcuate seaming pad supportably disposed therebetween for maintaining close lateral sidewall wrap register of an applied label during close conformable affixment respectively thereof to a tapered article circumferential exterior sidewall surface.

2. The tapered article labelling machine modification assembly according to claim 1 in which said spring tensioned bifurcated arm means pivotally deflect independently of one another about a common bearing and pintle connecting assembly.

3. The tapered article labelling machine modification assembly according to claim 1 in which said plurality of longitudinally extending progressively laterally displaced adhesive application wheel means is comprised of adhesive application wheels respectively having a drive shaft connecting collar which are respectively adapted to function as a doctor roller for control of adhesive film thickness picked-up and applied to a tapered article exterior circumferential sidewall surface by the next successive adhesive application wheel of said plurality.

4. The tapered article labelling machine modification assembly according to claim 1 in which said laterally spaced set of tapered article register guide means are each provided with an inward-leading guide flange.

5. A method of labelling curved and tapered articles, said method comprising first conveyably engaging and sequentially spacing apart respectively in axial rotation displacement circumferentially about the curved surface thereof along an arcuately configured guide track individual curved and tapered articles from a like successive contiguously abutted sidewall disposed stream of the same delivered thereto, second accelerating each of said sequentially spaced apart individual curved and tapered articles to a constant high-speed close density axially rotated circumferential displacement forwarding along said arcuately configured guide track, next applying a longitudinally displaced laterally offset metered film pattern of adhesive material to the external circumferential sidewall surface of each of said constantly high-speed close density axially rotated curved and tapered articles during continued forwarding displacement respectively thereof through a tapered article-to-label lateral wrap register orientation guide means disposed along said arcuately configured guide track followed by axially rotational engagement and adhered external circumferential sidewall surface incrementally progressive wrapping of a label upon said curved and tapered article in progressive lateral wrap register therewith by means of said metered film pattern of adhesive material previously applied thereto, and respective close conforming pressing of said applied label to the circumferential exterior sidewall surface of said tapered article.

* * * * *